United States Patent

Turley

[11] 3,883,620
[45] May 13, 1975

[54] POLYHALOALKYL PHOSPHATE ESTERS

[75] Inventor: Richard J. Turley, Orange, Conn.

[73] Assignee: Olin Corporation, New Haven, Conn.

[22] Filed: Feb. 21, 1973

[21] Appl. No.: 334,336

[52] U.S. Cl. ............ 260/963; 260/2.5 AJ; 260/960; 260/973; 260/974
[51] Int. Cl. ............................................. C07f 9/16
[58] Field of Search ............................... 260/963

[56] References Cited
UNITED STATES PATENTS 3,318,978   5/1967   Palethorpe ............ 260/963 X
3,780,144   12/1973   D'Alelio ............... 260/963 X FOREIGN PATENTS OR APPLICATIONS
784,986   10/1957   United Kingdom ........ 260/963

OTHER PUBLICATIONS

Bios, 987, 17.
Fiat, 1313, II, 70.
Carter, Organic Reactions III, p. 213–217 (1962).
Myannik et al., Chemical Abstract, Vol. 62 (1965) 11676.
Sanin et al., Chemical Abstracts, Vol. 66 (1967) 55030e.

*Primary Examiner*—Lorraine A. Weinberger
*Assistant Examiner*—Richard L. Raymond
*Attorney, Agent, or Firm*—James B. Haglind; Donald F. Clements; Thomas P. O'Day

[57] ABSTRACT

Novel polyhaloalkyl phosphate esters having the formula

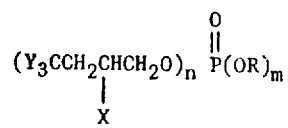

or

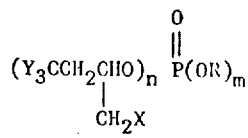

wherein
R represents an alkyl group having 1 to 4 carbon atoms,
X represents chlorine or bromine,
each Y represents independently chlorine or bromine,
$n$ represents an integer from 1 to 3, and
$m$ represents an integer from 0 to 2,
with the proviso that $m + n = 3$.

These esters are useful as flame-retardant additives in plastics, especially polyurethanes.

12 Claims, No Drawings

POLYHALOALKYL PHOSPHATE ESTERS

This invention relates to a new group of polyhaloalkyl phosphate esters and to their use as flame-retardant additives in polyurethane foam. More particularly, this invention relates to a select group of tetrahalobutyl phosphate esters.

The wide range of utility of polyurethane foam has been somewhat circumscribed by its flammability. Consequently, numerous efforts have been made in recent years to develop ways of imparting flame-retardancy to the foam. Such efforts have produced a variety of fire suppressant or flame-retardant compounds which are either incorporated in the polyurethane prepolymer mix or applied to the polyurethane after foaming.

However, many of the flame retardant additives developed in the art have been found unsatisfactory because they have a detrimental effect on the foam or considerably alter the basic properties of the foam. Furthermore, some of the prior art flame retardants are relatively costly to prepare and therefore they are not economically feasible to use in the manufacture of foam.

A variety of haloalkyl phosphate esters have been known in the art. See for example U.S. Pat. Nos. 3,027,296 and 3,318,978, the latter disclosing certain tetrachlorobutyl phosphate esters which are said to be useful as flame-retardants for acrylonitrile polymer compositions.

It is the primary object of this invention to provide a new group of polyhaloalkyl phosphate esters. A further object is to provide a select group of tetrahalobutyl phosphate esters which are relatively easy to prepare and economically feasible to use as flame-retardant additives in polyurethane foam.

The polyhaloalkyl esters of the present invention are tetrahalobutyl phosphates having the formula:

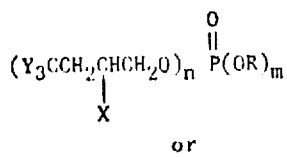

I or

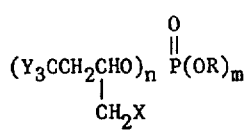

II wherein
R represents an alkyl group having 1 to 4 carbon atoms,
X represents chlorine or bromine,
each Y represents independently chlorine or bromine,
$n$ represents an integer from 1 to 3, and
$m$ represents an integer from 0 to 2,
with the proviso that $m + n = 3$.

When incorporated in a polyurethane foam forming reaction mixture before foaming, these esters impart flame-retardant properties to the resulting foam.

The esters of the present invention can be prepared by various procedures such as described, for example, in Kosolapoff, G. M., Organophosphorus Compounds, 1950, pages 211, 213, 216, 224, 226 and 230. For example, esters of formulas I and II in which $n$ is 3 can be prepared by reacting three moles of the appropriate tetrahalobutyl alcohol with one mole of phosphorus oxyhalide in the presence of an amine such as pyridine. This reaction is illustrated in equation III below.

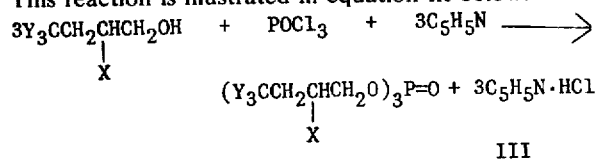

III wherein X and Y have the significance indicated above.

Tetrahalobutyl esters of formulas I or II in which $n$ is 2 can be prepared by reacting two moles of the appropriate tetrahalobutyl alcohol with one mole of phosphorus oxyhalide. The diester formed is further reacted with an aliphatic alcohol having 1 to 4 carbon atoms, both reactions taking place in the presence of an amine such as pyridine. These reactions are illustrated in equations IV and V below.

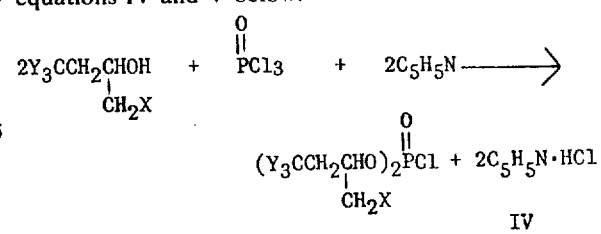

IV

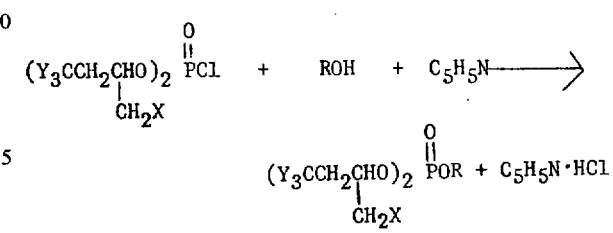

V wherein X, Y and R have the significance indicated above.

Esters of formulas I or II in which $n$ is 1 are prepared by reacting one mole of the appropriate tetrahalobutyl ester with one mole of phosphorus oxyhalide. The monoester thus formed is then further reacted with two moles of an aliphatic alcohol having 1 to 4 carbon atoms, both reactions taking place in the presence of an amine such as pyridine, as illustrated in equations VI and VII below.

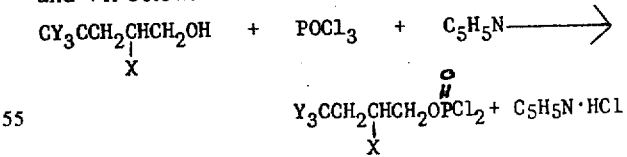

VI

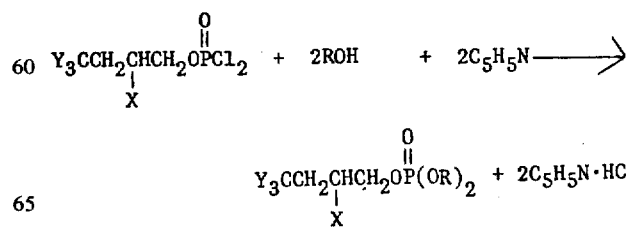

VII wherein X, Y and R have the significance indicated above.

An alternative method of preparation, particularly suitable for secondary alcohol derivatives, is the reaction of polyhaloalkylene oxide with phosphorus oxyhalide or phosphorus thiohalide in the presence of titanium tetrachloride.

Tetrahalobutyl alcohols used as starting materials in the preparation of the esters of the present invention, may be prepared, for example, by the methods disclosed in U.S. Pat. No. 3,399,241, issued to E. Smith or U.S. Pat. No. 3,316,291, issued to Rostyslaw.

Illustrative examples of the compounds represented by formula I include:
  Dimethyl 2,4,4,4-tetrachlorobutyl phosphate
  Tris(2,4,4,4-tetrachlorobutyl) phosphate
  Propyl bis(2,4,4,4-tetrabromobutyl) phosphate
  Dibutyl 2-chloro-4,4,4-tribromobutyl phosphate
  Tris(2-bromo-4,4,4-trichlorobutyl) phosphate
  Methyl bis(2-bromo-4,4,4-trichlorobutyl) phosphate
  Diethyl 2-bromo-4,4,4-trichlorobutyl phosphate.

Illustrative examples of the compounds represented by formula II include:
  Dimethyl 1,4,4,4-tetrachloro-2-butyl phosphate
  Diethyl 1-bromo-4,4,4-trichloro-2-butyl phosphate
  Methyl bis(1,4,4,4-tetrachloro-2-butyl) phosphate
  Dipropyl 1-chloro-4,4,4-tribromo-2-butyl phosphate
  Tris(1-bromo-4,4,4-trichloro-2-butyl) phosphate
  Dimethyl 1-bromo-4,4,4-trichloro-2-butyl phosphate
  Dibutyl 1,4,4,4-tetrabromo-2-butyl phosphate
  Tris(1,4,4,4-tetrachloro-2-butyl) phosphate.

Although the invention encompasses any phosphate ester of formulas I and II, preferred are those esters in which each Y represents chlorine, and of these, particularly preferred are those esters in which R represents ethyl or methyl.

Illustrative examples of the preferred esters according to the invention include:
  Dimethyl 2,4,4,4-tetrachlorobutyl phosphate
  Tris(2,4,4,4-tetrachlorobutyl) phosphate
  Tris(2-bromo-4,4,4-trichlorobutyl) phosphate
  Methyl bis(2-bromo-4,4,4-trichlorobutyl) phosphate
  Diethyl 2-bromo-4,4,4-trichlorobutyl phosphate
  Dimethyl 1,4,4,4-tetrachloro-2-butyl phosphate
  Diethyl 1-bromo-4,4,4-trichloro-2-butyl phosphate
  Methyl bis(1,4,4,4-tetrachloro-2-butyl) phosphate
  Tris(1-bromo-4,4,4-trichloro-2-butyl) phosphate
  Dimethyl 1-bromo-4,4,4-trichloro-2-butyl phosphate
  Tris(1,4,4,4-tetrachloro-2-butyl) phosphate.

The new compositions of the present invention are highly useful as flame retardant additives in the production of synthetic polymer compositions, such as urethane elastomers and foam. They are of particular utility in the production of flame retardant, flexible polyurethane foam.

In preparing flame-retardant polyurethane foam in accordance with the invention, either the so-called "one-shot method" or the "semi-prepolymer technique" ("quasi-prepolymer" technique) may be employed. Any combination of polyol components including polyester polyols or polyether polyols, organic polyisocyanate, foaming agent, catalyst, and other reactants capable of forming a cellular urethane material can be used. It is well known in the art, for example, to prepare flexible polyurethane foam-forming formulations comprising a polyether polyol component having a hydroxyl number of less than about 250, an organic polyisocyanate, a foaming agent, and a catalyst. Typical formulations are described in U.S. Pat. Nos. 3,072,582, issued Jan. 8, 1963, and No. 3,437,804, issued Oct. 17, 1967, and in Canadian Pat. No. 705,938, issued Mar. 16, 1965.

In utilizing the tetrahalobutyl phosphate esters of the present invention as flame-retardants for polyurethane foam, they are added to the polyurethane foam-forming reaction mixture prior to foaming. Conveniently, they are first blended with the polyol component used in making the foam, and the blend is then added to the other ingredients of the polyurethane foam-forming reaction mixture.

The tetrahalobutyl phosphate esters of the present invention can be used in any proportion which is effective in imparting flame-retardant properties to the foam without adversely affecting or altering the properties of the foam. Usually an additive proportion is used, for example, from about 5 to about 30 parts per 100 parts by weight of the polyol component used in making the foam. Preferably, 10-25 parts per 100 parts by weight of the polyol component are used. However, greater or lesser amounts may be used if desired.

The esters of the invention are also of utility as plasticizers. For example, tris(2,4,4,4-tetrachlorobutyl) phosphate can be used as a plasticizer in polyvinyl chloride compositions.

The following examples are presented to further illustrate the invention without any intention of being limited thereby. All parts and percentages are by weight unless otherwise specified.

EXAMPLE I (Dimethyl 2,4,4,4-tetrachlorobutyl phosphate)

Into a 3-necked flask fitted with a stirrer, thermometer and drying tube, a solution of 91.8 g. (0.6 mole) $POCl_3$ and 127 g. (0.6 mole) 2,4,4,4-tetrachlorobutanol in a mixture of 400 mls. of carbon tetrachloride and 100 mls. of chloroform was poured. A total of 52 g. (0.67 mole) of pyridine was added dropwise while stirring and holding the temperature below 12°C. A mixture of 42 g. (1.3 moles) of methanol in 104 g. (1.3 moles) of pyridine was added while keeping the temperature below 21°C. After completion of the reaction the organic phase was successively washed with aqueous 20% $H_2SO_4$ solution, water, saturated aqueous $NaHCO_3$, and water. The solution was dried and concentrated at reduced pressure to give 158 g. (82%) of dimethyl-2,4,4,4-tetrachlorobutyl phosphate. Distillation at 130°C./0.3 mm. gave a purified product having n(24/D) 1.4766. The phosphate structure was substantiated by infrared analysis.

Elemental Analysis:

Calcd. for $C_6H_{11}Cl_4O_4P$: % Cl, 44.38; % P, 9.69
Found: % Cl, 45.49; % P, 9.48

EXAMPLE II

Tris(2,4,4,4-tetrachlorobutyl) phosphate

A total of 46.1 g. (0.3 mole) of phosphorus oxychloride was added dropwise to 191 g. (0.9 mole) of stirred 2,4,4,4-tetrachlorobutanol at 80°–85°C. The mixture was held at 80°–90°C. under reduced pressure until HCl evolution ceased. The mixture was then dissolved in CCl$_4$, and successively washed with H$_2$O, saturated aqueous NaHCO$_3$, and water. The solvent was removed under reduced pressure, the product dissolved in dioxane, and treated with an acetic anhydridepyridine mixture. The mixture was washed and the solvent removed by heating in vacuo to give 87 g. (43%) of tris(2,4,4,4-tetrachlorobutyl) phosphate, n(26/D) 1.5212. Infrared analysis confirmed the phosphate structure.

Elemental Analysis:

Calcd. for C$_{12}$H$_{15}$Cl$_{12}$O$_4$P: % Cl, 62.65; % P, 4.56
Found: % Cl, 63.67; % P, 4.40

EXAMPLE III (Dimethyl 1,4,4,4-tetrachloro-2-butyl phosphate)

Pyridine, 85 g. (1.07 moles), was added dropwise at 15°–20°C. to a solution of 212 g. (1.0 mole) 1,4,4,4-tetrachloro-2-butanol and 153 g. (1.0 mole) phosphorus oxychloride in 500 ml. of a carbon tetrachloride-chloroform mixture (4:1 by volume) with vigorous stirring. A solution of 67.3 g. (2.1 moles) methanol in 168 g. (2.1 moles) pyridine was then added dropwise at 25°–27°C. The product was washed as in Example II and treated with an acetic anhydridepyridine mixture. A total of 99.6 g. (30%) of dimethyl 1,4,4,4-tetrachloro-2-butyl phosphate was distilled at 129°–31°C./25 mm.; n(23/D) 1.4785. The phosphate structure was confirmed by infrared analysis.

Elemental Analysis:

Calcd. for C$_6$H$_{11}$Cl$_4$O$_4$P: % Cl, 44.38; % P, 9.69
Found: % Cl, 44.33; % P. 9.26

EXAMPLE IV (Dimethyl 1-bromo-4,4,4-trichloro-2-butyl phosphate)

To a vigorously stirred solution of 154 g. (0.6 mole) of 1-bromo-4,4,4-trichloro-2-butanol and 92 g. (0.6 mole) phosphorous oxychloride in 100 ml. of a mixture of CCl$_4$—CHCl$_3$ (4:1 by volume) was added dropwise 53 g. (0.68 mole) pyridine at about 23°C. Following completion of the reaction, the mixture was heated to 52°C. After cooling to 23°–28°C., a mixture of 41.5 g. (1.3 mole) methanol in 106 g. (1.3) pyridine was added dropwise. The product was worked up as in Example III and distilled in vacuo to give 181 g. (83%) of dimethyl 1-bromo-4,4,4-trichloro-2-butyl phosphate as a light yellow liquid, n(25/D) 1.4968. Infrared analysis confirmed the phosphate structure.

Elemental Analysis:

Calcd. for C$_6$H$_{11}$BrCl$_3$O$_4$P: % Br, 21.92; % Cl, 29.18
% P, 8.49
Found: % Br, 22.38; % Cl, 30.13;
% P, 8.05

EXAMPLE V

Methyl bis(1,4,4,4-tetrachloro-2-butyl) phosphate

Dropwise addition of 123 g. (1.55 mole) pyridine to a well-stirred solution of 318 g. (1.5 mole) 1,4,4,4-tetrachloro-2-butanol and 76.5 g. (0.5 mole) phosphorus oxychloride in 200 ml. CCl$_4$ was made while the temperature kept below 15°C. Upon completion of the reaction, the mixture was heated to 53°C., cooled to room temperature and 70 ml. methanol added. The product was worked up as in Example IV and unreacted alcohol was removed by distillation. A total of 215 g. (86%) of methyl bis(1,4,4,4-tetrachloro-2-butyl) phosphate was obtained as a light brown viscous oil, n(24/D) 1.5102. Infrared analysis confirmed the phosphate structure.

Elemental Analysis:

Calcd. for C$_9$H$_{15}$Cl$_8$O$_4$P: % Cl, 56,80; % P, 6.20
Found: % Cl, 56.66; % P, 5.92

EXAMPLE VI

Flame-retardant polyurethane foam

A flexible polyurethane foam-forming reaction mixture was prepared consisting of the following ingredients in the indicated proportions:

| Ingredients | Amount |
|---|---|
| Oxypropylated glycerin (mol. wt. 3,000) | 100.0 gms. |
| Flame-retardant additive | 20.0 gms. |
| Silicone surfactant DC-190* | 1.5 mls. |
| 1,4-Diazabicyclo [2.2.2] octane | 0.4 mls. |
| Water | 4.0 mls. |
| Stannous octoate catalyst | 0.6 mls. |
| Toluene diisocyanate (80/20 mixture of 2,4 and 2,6 isomers) | 41.0 mls. |

* Dow Corning 190. This surfactant is a block copolymer of polydimethylsiloxane and a polyester resin.

In a formulation, dimethyl 1,4,4,4-tetrachloro-2-butyl phosphate as flame retardant was blended at ambient temperature with the oxypropylated glycerine. The other ingredients were blended into the mixture and after a final brief blending the mixture was poured into an open-top form whereupon foaming of the reaction mixture occurred. The foam was oven cured at 95°C. for about 10 minutes and further cured at ambient temperature for about 2 days. The flammability of the foam was tested by the method described in ASTM D1692-68. A self-extinguishing (SE) rating of 1.4 inches was obtained, which indicates the extent of burning was found to be limited to 1.4 inches, using a standard foam sample 6 inches in length.

EXAMPLE VII

Flame-retardant polyurethane foam

Example VI was repeated using dimethyl 1-bromo-4,4,4-trichloro-2-butyl phosphate as the flame-retardant additive. A SE rating of 1.7 inches was obtained.

EXAMPLE VIII

Flame-retardant polyurethane foam

Example VII was repeated using dimethyl 2,4,4,4-tetrachlorobutyl phosphate as the flame-retardant additive. A SE rating of 2.0 inches was obtained.

What is claimed is:

1. A tetrahalobutyl phosphate ester having the formula

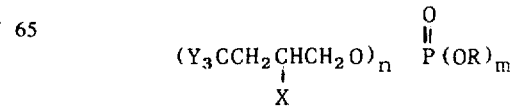

wherein R represents methyl or ethyl,
X represents chlorine or bromine,
each Y represents independently chlorine or bromine,
n represents an integer from 1 to 3, and
m represents an integer from 0 to 2,
with the proviso that $m + n = 3$.

2. A tetrahalobutyl phosphate ester as claimed in claim 1 wherein each Y is chlorine.

3. A tetrahalobutyl phosphate ester as claimed in claim 2 selected from the group consisting of
Dimethyl 2,4,4,4-tetrachlorobutyl phosphate,
Tris(2,4,4,4-tetrachlorobutyl) phosphate,
Tris(2-bromo-4,4,4-trichlorobutyl) phosphate,
Methyl bis(2-bromo-4,4,4-trichlorobutyl) phosphate, and
Diethyl 2-bromo-4,4,4-trichlorobutyl phosphate.

4. A tetrahalobutyl phosphate ester as claimed in claim 3 identified as dimethyl 2,4,4,4-tetrachlorobutyl phosphate.

5. A tetrahalobutyl phosphate ester as claimed in claim 3 identified as tris(2,4,4,4-tetrachlorobutyl)-phosphate.

6. A tetrahalobutyl phosphate ester having the formula

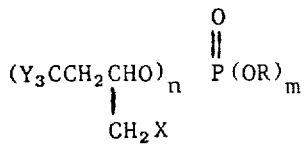

wherein
R represents an alkyl group having 1 to 4 carbon atoms,
X represents chlorine or bromine,
each Y represents independently chlorine or bromine,
n represents an integer from 1 to 3, and
m represents an integer from 0 to 2,
with the proviso that $m + n = 3$.

7. A tetrahalobutyl phosphate ester as claimed in claim 6 wherein each Y is chlorine.

8. A tetrahalobutyl phosphate ester as claimed in claim 6 selected from the group consisting of
Dimethyl 1,4,4,4-tetrachloro-2-butyl phosphate,
Diethyl 1-bromo-4,4,4-trichloro-2-butyl phosphate,
Methyl bis(1,4,4,4-tetrachloro-2-butyl) phosphate,
Dipropyl 1-chloro-4,4,4-tribromo-2-butyl phosphate,
Tris(1-bromo-4,4,4-trichloro-2-butyl) phosphate,
Dimethyl 1-bromo-4,4,4-trichloro-2-butyl phosphate,
Dibutyl 1,4,4,4-tetrabromo-2-butyl phosphate, and
Tris(1,4,4,4-tetrachloro-2-butyl) phosphate.

9. A tetrahalobutyl phosphate ester as claimed in claim 7 wherein R is ethyl or methyl.

10. A tetrahalobutyl phosphate ester as claimed in claim 9 identified as dimethyl 1,4,4,4-tetrachloro-2-butyl phosphate.

11. A tetrahalobutyl phosphate ester as claimed in claim 9 identified as dimethyl 1-bromo-4,4,4-trichloro-2-butyl phosphate.

12. A tetrahalobutyl phosphate ester as claimed in claim 8 identified as methyl bis (1,4,4,4-tetrachloro-2-butyl) phosphate.

* * * * *